United States Patent
Hachiya et al.

(10) Patent No.: US 8,049,480 B2
(45) Date of Patent: Nov. 1, 2011

(54) COMPARATOR-SYSTEM DC-DC CONVERTER

(75) Inventors: Shogo Hachiya, Tokyo (JP); Ko Takemura, Tokyo (JP)

(73) Assignee: Thine Electronics, Inc., Tokyo (JP)

( * ) Notice: Subject to any disclaimer, the term of this patent is extended or adjusted under 35 U.S.C. 154(b) by 187 days.

(21) Appl. No.: 12/095,270

(22) PCT Filed: Oct. 3, 2007

(86) PCT No.: PCT/JP2007/069364
§ 371 (c)(1),
(2), (4) Date: May 28, 2008

(87) PCT Pub. No.: WO2008/041722
PCT Pub. Date: Apr. 10, 2008

(65) Prior Publication Data
US 2009/0160414 A1    Jun. 25, 2009

(30) Foreign Application Priority Data

Oct. 4, 2006   (JP) .................................. 2006-273190

(51) Int. Cl.
*G05F 1/56* (2006.01)
*G05F 1/565* (2006.01)
*G05F 1/575* (2006.01)

(52) U.S. Cl. ........................................ 323/283; 323/284

(58) Field of Classification Search ........... 323/273–285
See application file for complete search history.

(56) References Cited

U.S. PATENT DOCUMENTS

| 5,742,151 | A | * | 4/1998 | Hwang | .......................... 323/222 |
| 2007/0090818 | A1 | | 4/2007 | Nishimori | |

FOREIGN PATENT DOCUMENTS

| JP | 11136929 A | 5/1999 |
| JP | 2002153075 A | 5/2000 |
| JP | 2000287439 A | 10/2000 |
| JP | 2005117730 A | 4/2005 |

* cited by examiner

*Primary Examiner* — Gary L Laxton
*Assistant Examiner* — Nusrat Quddus
(74) *Attorney, Agent, or Firm* — Sughrue Mion, PLLC

(57) ABSTRACT

The comparator-system DC-DC converter 1 comprises the voltage conversion section 100 and the control unit 200. The control unit 200 comprises comparator sections 20 and 40 which compare the output voltage of the voltage conversion section 100 and the reference voltage, and determine a predetermined ON width of the ON pulse or the OFF width of the OFF pulse of the control signal Ssw, and a counter section 60 which counts at least either one of the ON pulses and OFF pulses of the control signal and counts the reference clocks to adjust the predetermined ON width so that the ratio between the count value of the control signal Ssw and the count value of the reference clock is M:N where M and N are natural numbers.

5 Claims, 10 Drawing Sheets

COMPARATOR-SYSTEM DC-DC CONVERTER

TECHNICAL FIELD

The present invention relates to a comparator-system DC-DC converter.

BACKGROUND ART

DC-DC converters which generate an output voltage which is stabilized by an input voltage are known. A variety of systems may be considered as methods of stabilizing the output voltage of a DC-DC converter. For example, Patent Document 1 mentions a switching DC-DC converter which uses a PWM (pulse width modulation). The PWM system is able to stabilize the output voltage by making the switching frequency constant and adjusting the ON pulse width. There are also switching DC-DC converters which employ a comparator system. A comparator system is able to stabilize the output voltage by using a comparator to make the ON pulse width constant and adjust the OFF pulse width (that is, the switching frequency).

This DC-DC converter can be used as a voltage source such as a PU (Processor Unit). In a PU, the consumed current increases suddenly when moving from a standby state to a processing state. When the output voltage drops suddenly as a result of a sudden increase in the load current, a comparator-system DC-DC converter immediately outputs the ON pulse. Hence, in comparison with a PWM system which is unable to output a pulse during a predetermined OFF-pulse period, the output voltage stabilizes rapidly. Thus, the comparator system possesses the characteristic that the response characteristic with respect to a sudden increase in the load current is favorable in comparison with that of a PWM system.

[Patent Document 1] Japanese Patent Application Laid Open No. 2000-287439.

DISCLOSURE OF INVENTION

Problem to be Solved by the Invention

Further, in a comparator-system DC-DC converter, the switching cycle Tf is as follows assuming that the ON-pulse width is 'Pon', the OFF-pulse width is 'Poff', the input voltage is 'Vin', and the output voltage is 'Vout'.

$$Tf = Pon + Poff = Vout/Vin \times Tf + ((Vin - Vout)/Vin) \times Tf \quad \text{(Equation (1))}$$

Therefore, in cases where Vin and Vout are fixed, Pon is constant and therefore Poff is uniquely fixed. In other words, in the case of a comparator-system DC-DC converter, Pon is constant and therefore, if Vin and Vout are fixed, the ON duty for making the output voltage constant is fixed.

Here, when the ambient temperature rises, for example, the internal resistance of the circuit elements increases and the internal loss increases. Here, in the case of a comparator-system DC-DC converter, in order to compensate for the drop in the output voltage caused by an increase in the internal loss, the OFF pulse width shortens and the ON duty increases. Thus, with the comparator-system DC-DC converter, the switching frequency fluctuates gradually due to fluctuations in the ambient temperature. In addition, the OFF pulse width fluctuates and the switching frequency fluctuates due to fluctuations in the input voltage, output voltage, and output current. The ripple of the output voltage fluctuates due to fluctuations in the switching frequency and there is the possibility of a downstream circuit such as the PU working incorrectly. In addition, there is also a possibility of EMI measures over a width bandwidth being required.

Therefore, an object of the present invention is to provide a comparator-system DC-DC converter which makes it possible to reduce fluctuations in the switching frequency without impairing the response characteristic with respect to sudden increases in the load current.

Means For Solving The Problem

The comparator-system DC-DC converter of the present invention comprises (1) a voltage conversion section which comprises a switching element and generates an output voltage by voltage-converting the input voltage by controlling the switching element in accordance with a control signal; and (2) a control unit which generates a control signal for stabilizing the output voltage of the voltage conversion section.

The control unit comprises (a) a comparator section which compares the output voltage of the voltage conversion section and a reference voltage, and determines a predetermined ON width of an ON pulse or the OFF width of an OFF pulse of the control signal; and (b) a counter section which counts at least either one of the ON pulses and OFF pulses of the control signal and counts the reference clocks to adjust the predetermined ON width so that the ratio between the count value of the control signal and the count value of the reference clock is M:N (M and N are natural numbers).

With this comparator-system DC-DC converter, the predetermined ON width of the ON pulse is adjusted by the counter section even when the OFF width of the OFF pulse is short as a result of an increase in the output current, for example, and the ratio between the count value of the control signal and the count value of the reference clock is M:N. In other words, the frequency of the control signal is kept constant by the counter section.

Therefore, with this comparator-system DC-DC converter, fluctuations of the switching frequency can be reduced.

The comparator section preferably comprises a first comparator which detects that the output voltage of the voltage conversion section is smaller than the reference voltage, and determines the detection time point as an ON pulse start time point; and a second comparator which detects that a predetermined time has elapsed from the ON pulse start time point, and determines the detection time point as an ON pulse end time point, and the counter section preferably adjusts the predetermined ON width by adjusting the predetermined time.

In addition, the control unit preferably further comprises a timer section which comprises a timer capacitor which is connected to a fixed current source and starts the charging of the timer capacitor from the ON pulse start time point. In this case, the second comparator preferably detects that a predetermined time has elapsed from the ON pulse start time point by detecting that the voltage of the timer capacitor of the timer section is equal to or more than a predetermined voltage, and the counter section preferably adjusts the predetermined time by adjusting a charging current of the timer capacitor of the timer section.

In addition, the counter section preferably comprises (1) a first counter which counts at least either one of the ON pulses and the OFF pulses of the control signal and generates a pulse signal when the count value has reached a predetermined value; (2) a second counter which counts the reference clocks and generates a pulse signal when the count value has reached a predetermined value; (3) a NAND circuit which receives the pulse signal from the first counter and the pulse signal from the second counter; (4) a NOR circuit which receives the pulse signal from the first counter and the pulse signal from the second counter; (5) a charge pump circuit which supplies a charging current in accordance with an output signal from the NAND circuit and draws a charging current in accordance with an output signal from the NOR circuit; and (6) a counter capacitor which is connected to the charge pump circuit, and (7) the charging current of the timer capacitor is preferably adjusted in accordance with the voltage across the terminals of the counter capacitor.

Furthermore, the counter section preferably comprises (1) a first counter which counts at least either one of the ON pulses and the OFF pulses of the control signal and generates a pulse signal when the count value has reached a predetermined value; (2) a second counter which counts the reference clocks and generates a pulse signal when the count value has reached a predetermined value; (3) an up/down counter which is connected to an output terminal of the first counter and an output terminal of the second counter, and (4) the charging current of the timer capacitor is preferably adjusted in accordance with the output signal of the up/down counter.

EFFECT OF THE INVENTION

The present invention makes it possible to obtain a comparator-system DC-DC converter which is capable of reducing fluctuations in the switching frequency.

Figure 1:
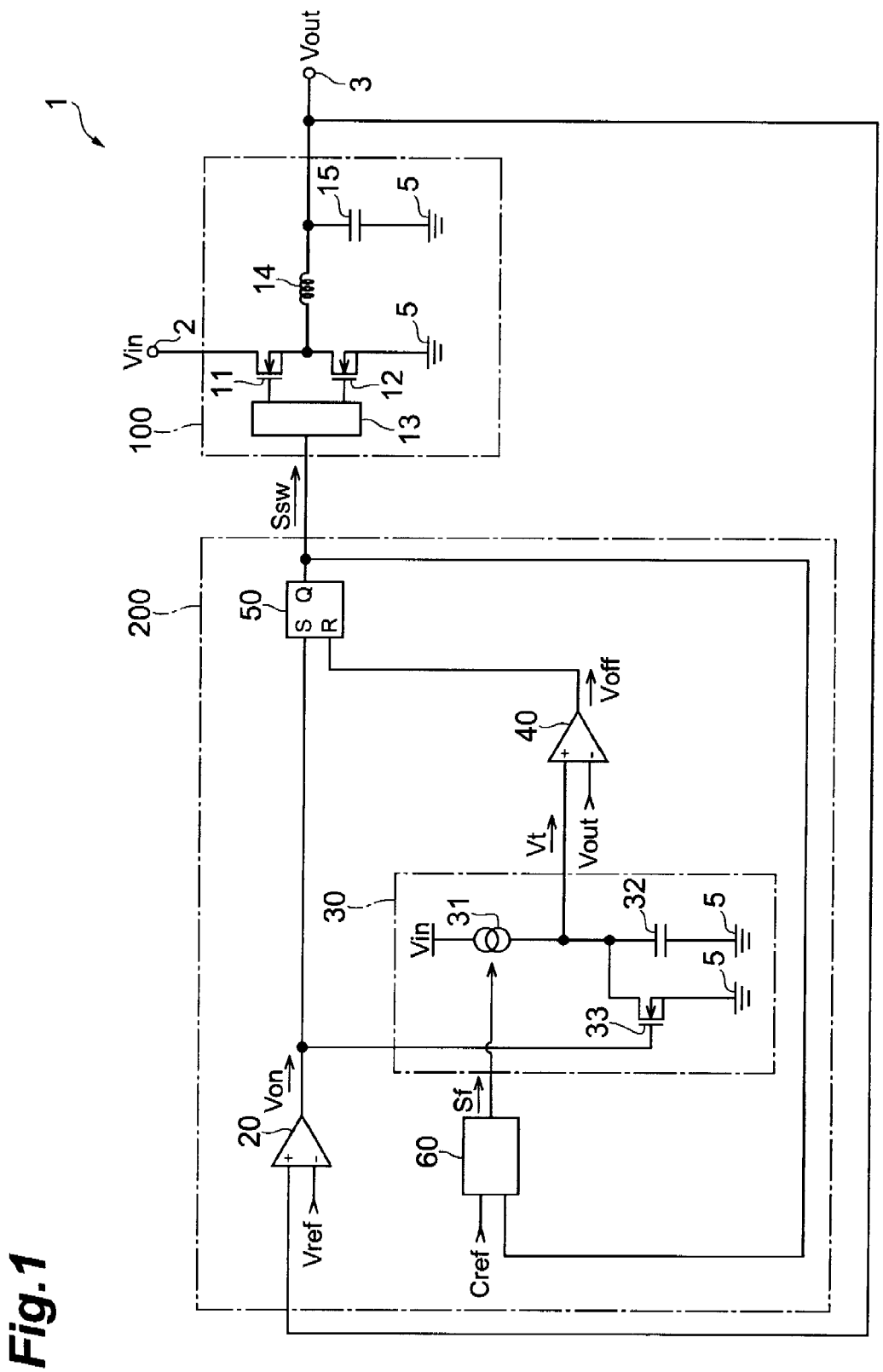
FIG. 1 is a circuit diagram which shows a comparator-system DC-DC converter according to a first embodiment of the present invention.

LIST OF ELEMENTS 1 comparator-system DC-DC converter
11, 12 switching element
13 drive circuit
14 inductor
15 capacitor
20 first comparator (comparator section)
30 timer section
31 fixed current generation circuit (fixed current source)
32 timer capacitor
33 transistor
34 input voltage division circuit
35 voltage follower
36 resistance element
36A variable resistance section
37 current mirror circuit
38 gm amplifier
40 second comparator (comparator section)
60 counter section
61 first counter
62 second counter
63 NOR circuit
64 NAND circuit
65, 66 inverter
67 charge pump circuit
68 counter capacitor
68A up/down counter
100 voltage conversion section
200 control unit

BEST MODE FOR CARRYING OUT THE INVENTION

Preferred embodiments of the present invention will be described in detail hereinbelow with reference to the drawings. The same reference numerals are assigned to the same or equivalent parts in the respective drawings.

First Embodiment

FIG. 1 is a circuit diagram which shows a comparator-system DC-DC converter according to a first embodiment of the present invention. The comparator-system DC-DC converter 1 shown in FIG. 1 is constituted by a voltage conversion section 100 and a control unit 200.

The voltage conversion section 100 constitutes a synchronous rectification circuit and produces an output voltage Vout obtained by voltage-converting an input voltage Vin applied to an input terminal 2 at an output terminal 3 in accordance with a switching control signal Ssw from the control unit 200. The voltage conversion section 100 comprises two switching elements 11 and 12, a drive circuit 13, an inductor 14, and a capacitor 15.

The switching elements 11 and 12 are N-type MOSFETs. The drain of the switching element 11 is connected to the input terminal 2 and the source of the switching element 11 is connected to the drain of the switching element 12. The source of the switching element 12 is grounded to GND5. The gates of the switching elements 11 and 12 are each connected to drive circuit 13.

The drive circuit 13 generates an auxiliary drive signal in accordance with a switching control signal Ssw from the control unit 200 and supplies this drive signal to the gate of the switching elements 11 and 12 respectively. In this embodiment, the drive circuit 13 is a step-up voltage circuit for the drive signal which is supplied to the switching element 11 and a synchronous rectification drive circuit which comprises a date-time generation circuit or the like for avoiding the synchronized ON of the switching elements 11 and 12.

One end of the inductor 14 is connected to the source of the switching element 11 and the drain of the switching element 12. The other end of the inductor 14 is connected to the output terminal 3. A capacitor 15 for output voltage smoothing is connected between the other end of the inductor 14 and output terminal 3, and the GND5. The control unit 200 generates a switching control signal for stabilizing the output voltage Vout of the voltage conversion section 100. The control unit 200 comprises a first comparator 20, a timer section 30, a second comparator 40, an SR-FF 50, and a counter section 60.

The positive input terminal of the first comparator 20 is connected to the output terminal 3 of the voltage conversion section 100 and a reference voltage (reference potential) Vref is input to the negative input terminal. The output terminal of the first comparator 20 is connected to the timer section 30 and the set terminal of the SR-FF 50.

The timer section 30 comprises a fixed current generation circuit 31, a timer capacitor 32, and a transistor 33. The fixed current generation circuit 31 is connected between the input terminal 2 and timer capacitor 32 and supplies a charging current of a fixed value to the timer capacitor 32. The fixed current generation circuit 31 is able to modify the value of the charging current in accordance with a frequency control signal Sf from the counter section 60.

The timer capacitor 32 is connected between the fixed current generation circuit 31 and GND5. Transistor 33 is connected in parallel between the terminals of the timer capacitor 32. In other words, the drain of the transistor 33 is connected to a node between the fixed current generation circuit 31 and one end of the timer capacitor 32 and the source of the transistor 33 is connected to GND5. An output voltage Von from the first comparator 20 is input to the gate of the transistor 33.

The node between the fixed current generation circuit 31 and one end of the timer capacitor 32 is connected to the positive input terminal of the second comparator 40. An output voltage Vout is input to the negative input terminal of the second comparator 40. The output terminal of the second comparator 40 is connected to the reset terminal of the SR-FF 50.

The SR-FF 50 starts the generation of the ON pulses of the switching control signal Ssw and ends the generation of the OFF pulses of the switching control signal Ssw in accordance with the output voltage Von of the first comparator 20, and ends the generation of the ON pulses of the switching control signal Ssw and starts the generation of the OFF pulse of the switching control signal Ssw in accordance with the output voltage Voff of the second comparator 40.

Thus, the first comparator 20 detects that the output voltage Vout of the voltage conversion section 100 is smaller than the reference voltage Vref and sets the SR-FF 50 by producing a high level pulse voltage Von and determines the detection time point as the ON pulse start time point of the switching control signal Ssw.

In this embodiment, the fixed current generation circuit 31 is connected to the input terminal 2 and receives an input voltage Vin. However, as long as the voltage supply source of the fixed current generation circuit 31 is a supply source which has a predetermined potential difference from GND5 and is capable of supplying an output current which is required for the fixed current generation circuit 31, the voltage is not limited to the input voltage Vin of the input terminal 2.

In addition, the timer section 30 resets the voltage across the terminals of the timer capacitor 32 by means of the high level pulse voltage Von of the first comparator 20 and then functions as a timer by charging the timer capacitor 32 by means of a fixed current.

In addition, the second comparator 40 detects that the voltage across the terminals of the timer capacitor 32 of the timer section 30 is equal to or more than output voltage Vout, that is, detects that a predetermined time has elapsed from the start time point of the ON pulse, resets SR-FF 50 by producing a high level pulse voltage Voff, and determines the detection time point as the end time point of the OFF pulse of the switching control signal Ssw.

In other words, the first comparator 20 and second comparator 40 function as comparator sections which determine a predetermined ON width of the ON pulse of the switching control signal Ssw.

The counter section 60 receives a switching control signal Ssw and receives a reference clock Cref. The counter section 60 counts the ON pulses of the switching control signal Ssw and counts the reference clocks, and generates the frequency control signal Sf for adjusting a predetermined ON width of the ON pulse so that the count value of the switching control signal Ssw and the count value of the reference clock are equal.

Figure 2:
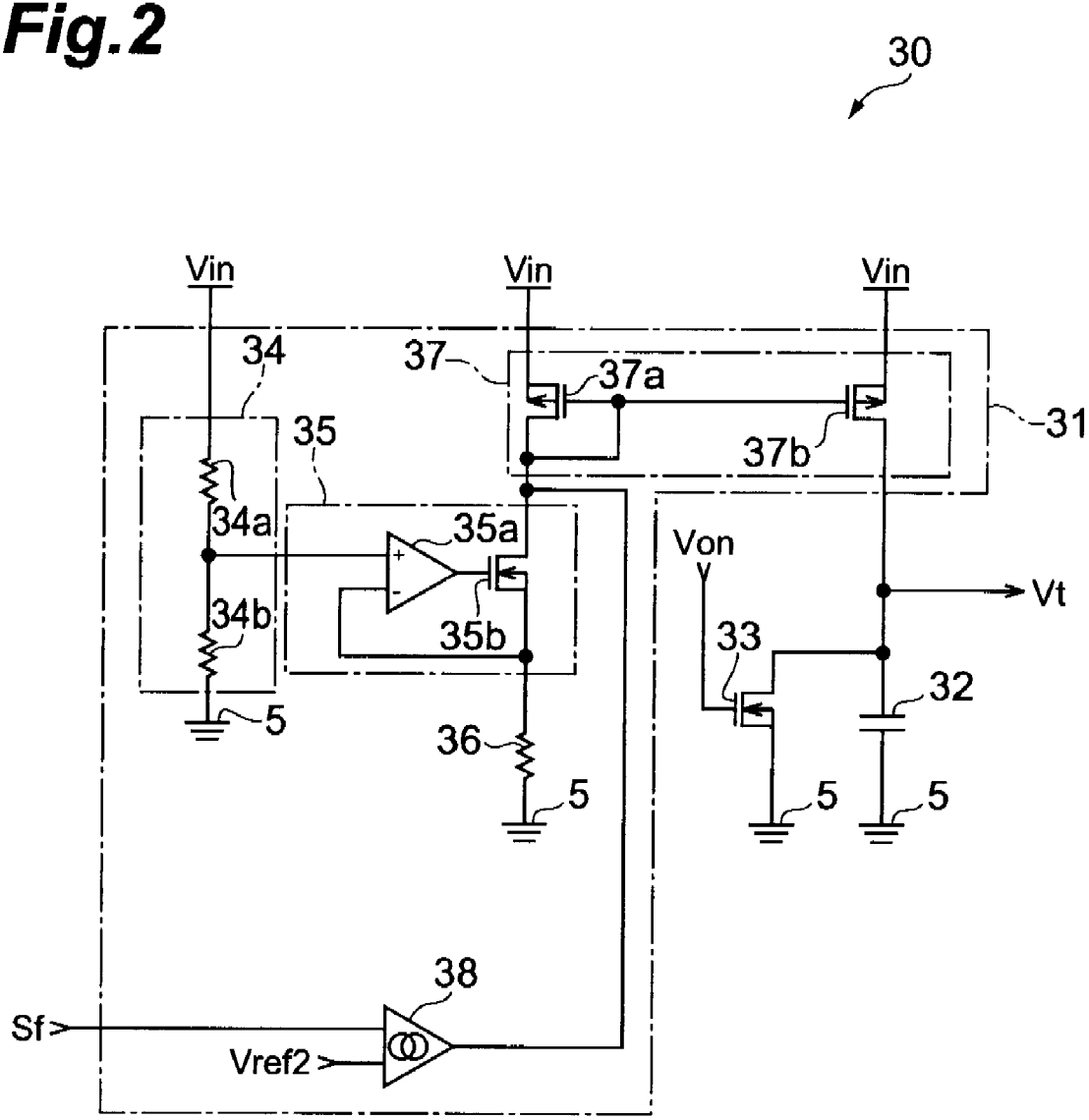
FIG. 2 is a circuit diagram which shows a timer section in FIG. 1.
Figure 3:
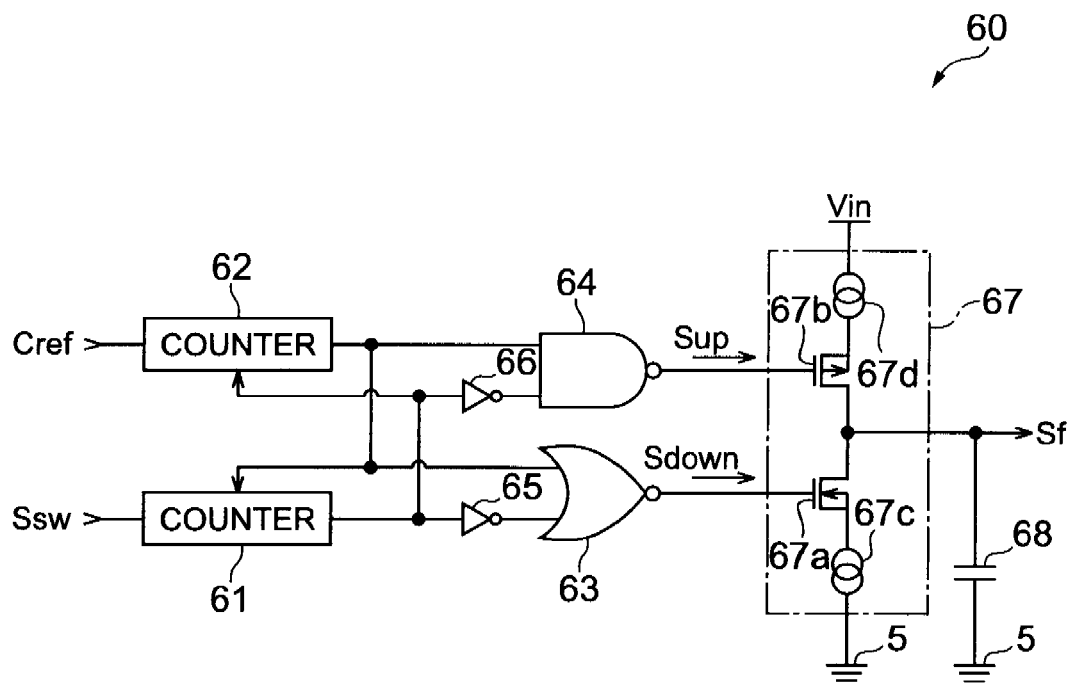
FIG. 3 is a circuit diagram which shows a counter section 60 in FIG. 1.

The timer section 30 and counter section 60 will be described in detail next. FIG. 2 is a circuit diagram which shows the timer section 30 in FIG. 1 and FIG. 3 is a circuit diagram which shows the counter section 60 in FIG. 1.

First, the timer section 30 will be described. FIG. 2 shows the fixed current generation circuit 31 in timer section 30 in detail. The fixed current generation circuit 31 comprises an input voltage division circuit 34, a voltage follower 35, a resistance element 36, a current mirror circuit 37, and a gm amplifier 38.

The input voltage division circuit 34 divides the input voltage Vin which is input by the input terminal 2. In this embodiment, the input voltage division circuit 34 is constituted by resistance elements 34a and 34b which are connected in series between the input terminal 2 and GND5. The voltage division between the resistance elements 34a and 34b is input to the voltage follower 35.

The voltage follower 35 is constituted by an error amplifier 35a and a transistor 35b. The resistance element 36 is connected between the source of the transistor 35b and GND5. In addition, the current mirror circuit 37 is connected between the drain of the transistor 35b and the input terminal 2.

The current mirror circuit 37 is constituted by a transistor 37a through which a reference current determined by the voltage follower 35 flows and a transistor 37b which generates a mirror current of the reference current which flows to the transistor 37a. The transistor 37b supplies the mirror current to the timer capacitor 32.

The frequency control signal Sf from the counter section 60 is input to one input terminal of the gm amplifier 38 and a reference voltage Vref2 is input to the other input terminal. The output terminal of the gm amplifier 38 is connected to a node between the transistor 37a of the current mirror circuit 37 and the voltage follower 35.

The gm amplifier 38 functions as a push/pull-type current source and draws a current from the transistor 37a of the current mirror circuit 37 when the frequency control signal Sf is equal to or more than the reference voltage Vref2 and supplies the current to the voltage follower 35 when the frequency control signal Sf is smaller than the reference voltage Vref2. In other words, the gm amplifier 38 applies the charging current of the timer capacitor 32 when Sf is equal to or more than Vref2 and reduces the charging current of the timer capacitor 32 when Sf is smaller than Vref2.

The counter section 60 will be described next. As shown in FIG. 3, the counter section 60 comprises two counters 61 and 62, a NOR circuit 63, a NAND circuit 64, two inverters 65 and 66, a charge pump circuit 67, and a counter capacitor 68.

A switching control signal Ssw is input to the input terminal of the first counter 61 and the output voltage of the second counter 62 is input to the reset terminal. The first counter 61 is a four-bit counter, for example. The first counter 61 counts the ON pulses of the switching control signal Ssw and, in cases where the count value has reached a maximum value '1111', outputs a high level pulse voltage and resets the output voltage during the next count of '1111'. In addition, the first counter 61 resets the output voltage when the output voltage of the second counter 62 has reached a high level. The output terminal of the first counter 61 is connected to one input terminal of the NOR circuit 63 via inverter 65.

The reference clock Cref is input to the input terminal of the second counter 62 and the output voltage of the first counter 61 is input to the reset terminal. The second counter 62 is a four-bit counter, for example. The second counter 62 counts the cycles of the reference clock and, in cases where the count value has reached a maximum value '1111', outputs a high level pulse voltage and resets the output voltage during the next count of '1111'. In addition, the second counter 62 resets the output voltage when the output voltage of the first counter 61 has reached a high level. The output terminal of the second counter 62 is connected to one input terminal of the NAND circuit 64.

The output voltage of the second counter 62 is input to the other input terminal of the NOR circuit 63. The output terminal of the NOR circuit 63 is connected to the charge pump circuit 67.

The output voltage from the first counter 61 is input via the inverter 66 to the other input terminal of the NAND circuit 64. The output terminal of the NAND circuit 64 is connected to the charge pump circuit 67.

The charge pump circuit 67 is constituted by a transistor 67a which comprises an n-type MOSFET, a transistor 67b which comprises a p-type MOSFET, and two fixed-current sources 67c and 67d. The source of the transistor 67a is connected to GND5 via the fixed current source 67c and the drain of the transistor 67a is connected to the drain of the transistor 67b. An input voltage Vin is input to the source of the transistor 67b via the fixed current source 67d. The gates of the transistors 67a and 67b receive an input of the output voltage of the NOR circuit 63 and the output voltage of the NAND circuit 64 respectively. A counter capacitor 68 is connected between the drain of the transistors 67a and 67b and GND5.

In this embodiment, an input voltage Vin is input to the source of the transistor 67b via a fixed current source 67d. However, as long as the supply source has a predetermined potential difference from GND5 and is capable of supplying an output current which is required for the fixed current sources 67c and 67d, the voltage is not limited to the input voltage Vin of the input terminal 2.

Figure 4:
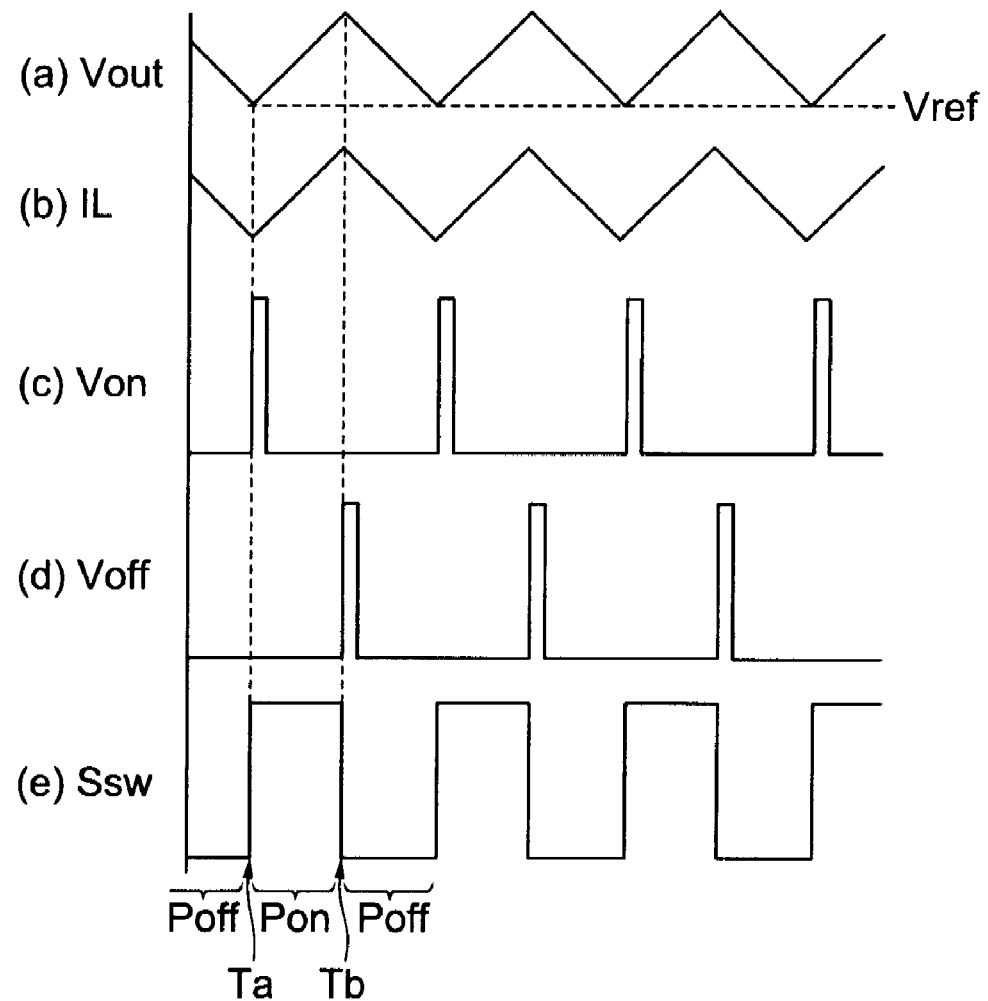
FIG. 4 is a timing chart which shows respective signal waveforms of the comparator-system DC-DC converter shown in FIG. 1.
Figure 5:
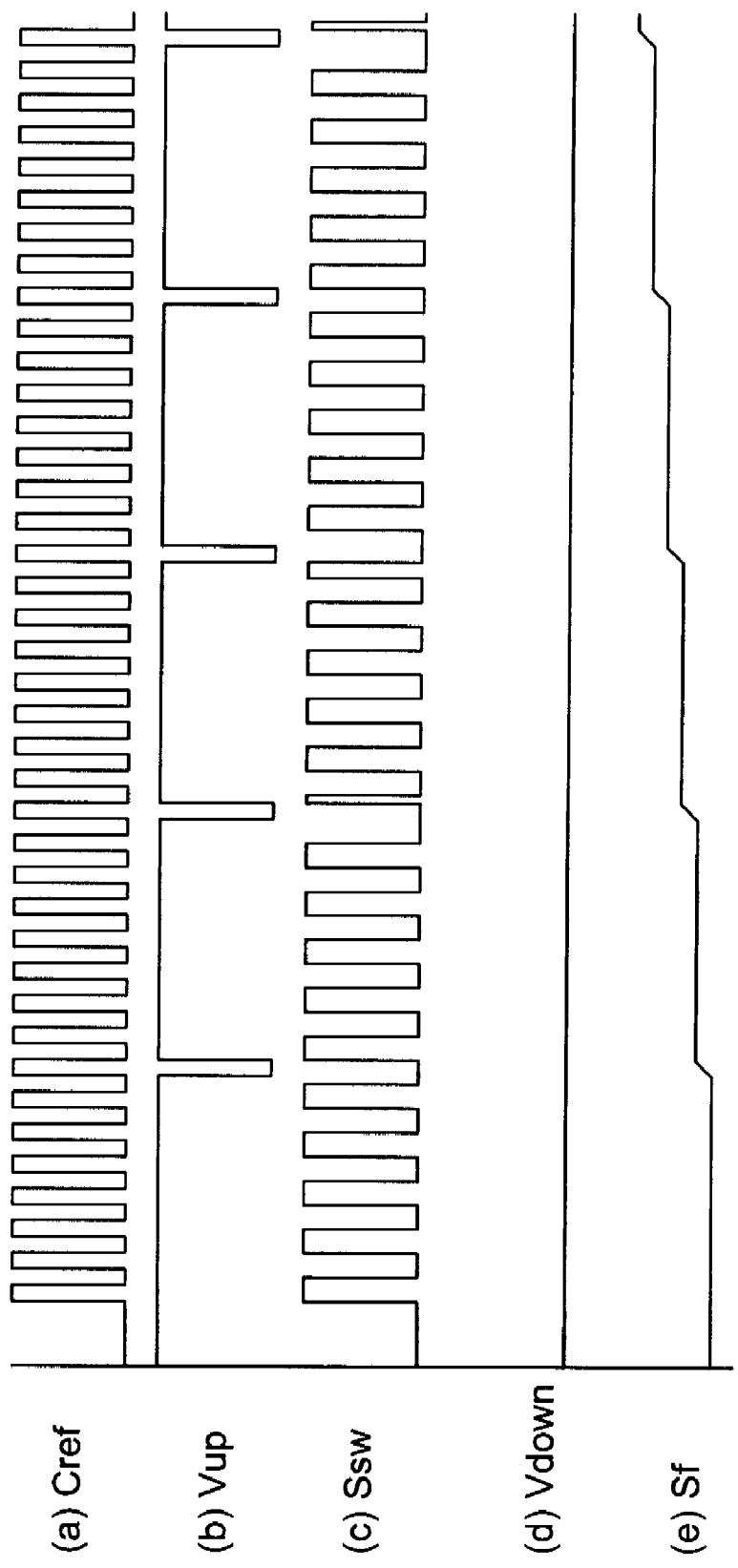
FIG. 5 is a timing chart which shows respective signal waveforms of the counter section shown in FIG. 3.

The operation of the comparator-system DC-DC converter 1 will be described next with reference to FIGS. 1 to 5. FIG. 4 is a timing chart which shows the respective signal waveforms of the comparator-system DC-DC converter 1 shown in FIG. 1. FIG. 5 is a timing chart which shows the respective signal waveforms of the counter section 60 shown in FIG. 3.

First, when the input voltage Vin is input to the input terminal 2, the switching control signal Ssw is generated by the control unit 200. The voltage conversion section 100 produces the output voltage Vout which is stabilized at the output terminal 3, in accordance with the switching control signal Ssw. In a steady state, the Vin and the ON time and so forth are set so that the switching frequency matches the frequency of the reference clock Cref.

When the output voltage Vout reaches the reduced reference voltage Vref ((a) of FIG. 4), a high level pulse voltage Von is generated by the first comparator 20 ((c) of FIG. 4)) and an ON pulse Pon for the switching control signal Ssw is produced by the SR-FF50 after the start time point Ta, the generation of the OFF pulse Poff ending at time point Ta ((e) of FIG. 4). Thus, an auxiliary drive signal is generated by the drive circuit 13, the switching element 11 enters an ON state and the switching element 12 enters an OFF state. As a result, a coil current IL which flows to coil 14 increases and the output voltage Vout rises ((a) and (b) of FIG. 4).

When a high level pulse voltage Von is generated by the first comparator 20, the transistor 33 temporarily enters an ON state and the voltage across the terminals of the timer capacitor 32 is reset, whereupon the timer capacitor 32 is gradually charged by the fixed current from the fixed current generation circuit 31. When the voltage across the terminals of the timer capacitor 32 reaches output voltage Vout, a high level pulse voltage Voff is generated by the second comparator 40 ((d) of FIG. 4), OFF pulse Poff is produced by the SR-FF50 after time point Th in the switching control signal Ssw, and the generation of ON pulse Pon ends at end time point Th ((e) of FIG. 4). Thus, an auxiliary drive signal is inverted by the drive circuit 13, the switching element 11 enters an OFF state, and the switching element 12 enters an ON state. As a result, when the output voltage Vout drops, the coil current IL is reduced. The output voltage Vout is stabilized as a result of the above operation being repeated.

Furthermore, when the ambient temperature drops, for example, the internal resistance value of the switching elements 11 and 12 and the inductor 14, for example, drops and the internal loss drops. Here, in order to compensate for the rise in the output voltage Vout, the OFF width of the OFF pulse Poff increases and the ON duty is reduced. However, the predetermined ON width of the ON pulse Pon is adjusted by the counter section 60.

More specifically, because the switching frequency of the switching control signal Ssw is lower than the frequency of the reference clock Cref ((a) and (c) of FIG. 5), the second counter 62 ends the count before the first counter 61 and outputs a high level pulse voltage. Thus, the NAND circuit 64 generates a low level pulse voltage Vup ((b) of FIG. 5) and the transistor 67b of the charge pump circuit 67 temporarily enters an ON state. However, the output voltage Vdown of the NOR circuit 63 remains at a low level ((d) of FIG. 5) and the transistor 67a of the charge pump circuit 67 remains in an OFF state. As a result, the counter capacitor 68 is temporally charged and the voltage across the terminals of the counter capacitor 68, that is, the frequency control signal Sf rises ((e) of FIG. 5).

Thereupon, the gm amplifier 38 draws a current that is proportional to the differential voltage between the frequency control signal Sf and the reference voltage Vref2 and the charging current of the timer capacitor 32 is increased. As a result, the time taken for the voltage Vt across the terminals of the timer capacitor 32 to reach the output voltage Vout grows short and the end time point Tb of the ON pulse Pon rises. As a result, the ON width of the ON pulse Pon narrows and the ON duty is fixed by Vin and Vout and therefore the OFF width of the OFF pulse Poff also narrows and the switching frequency rises. Thus, the counter section 60 controls the switching frequency so that same approaches the frequency of the reference clock Cref. Hence, fluctuations in the switching frequency are reduced.

However, when the ambient temperature rises, for example, the internal resistance value of the switching elements 11 and 12 and that of the inductor 14, for example, increases and the internal loss increases. Here, in order to compensate for the drop in the output voltage Vout, the OFF width of the OFF pulse Poff narrows and the ON duty is increased. However, the predetermined ON width of the ON pulse Pon is adjusted by the counter section 60.

More specifically, the switching frequency of the switching control signal Ssw is higher than the frequency of the reference clock Cref and, therefore, the first counter 61 ends the count before the second counter 62 and outputs a high level pulse voltage. Thus, the NOR circuit 63 generates a high level pulse voltage Vdown and the transistor 67a of the charge pump circuit 67 temporarily enters an ON state. However, the output voltage Vup of the NAND circuit 64 remains at a high level and the transistor 67b of the charge pump circuit 67 remains in an OFF state. As a result, the counter capacitor 68 is temporarily discharged and the voltage across the terminals of the counter capacitor 68, that is, the frequency control signal Sf drops.

Thus, the gm amplifier 38 outputs a current that is proportional to the differential voltage between the frequency control signal Sf and the reference voltage Vref2 and reduces the charging current of the timer capacitor 32. As a result, the time taken for the voltage Vt across the terminals of the timer capacitor 32 to reach the output voltage Vout is extended and the end time point Th of the ON pulse Pon is delayed. As a result, the ON width of the ON pulse Pon increases and the ON duty is fixed by Vin and Vout. Hence, the OFF width of the OFF pulse Poff also increases and the switching frequency is reduced. Thus, the counter section 60 controls the switching frequency so that same approaches the frequency of the reference clock Cref. Hence, fluctuations in the switching frequency are reduced.

Thus, the comparator-system DC-DC converter 1 of the first embodiment is capable of reducing fluctuations in the switching frequency which arise due to fluctuations in the conversion loss arising from fluctuations in the ambient temperature, I/O voltage fluctuations, and fluctuations in the switching frequency arising from fluctuations in the output current without impairing the response characteristic with respect to a sudden increase in the load current. As a result, fluctuations in the ripple of the output voltage can be reduced and the erroneous operation of a PU circuit or other downstream circuit can be prevented. In addition, EMI measures over a width bandwidth are not required and EMI measures can be performed at low cost and in a straightforward manner.

In addition, with the comparator-system DC-DC converter 1 of the first embodiment, the logical processing circuit of the counter section 60 is constituted by a NOR circuit, a NAND circuit, and an inverter. Hence, a high-speed operation is possible.

Figure 6:
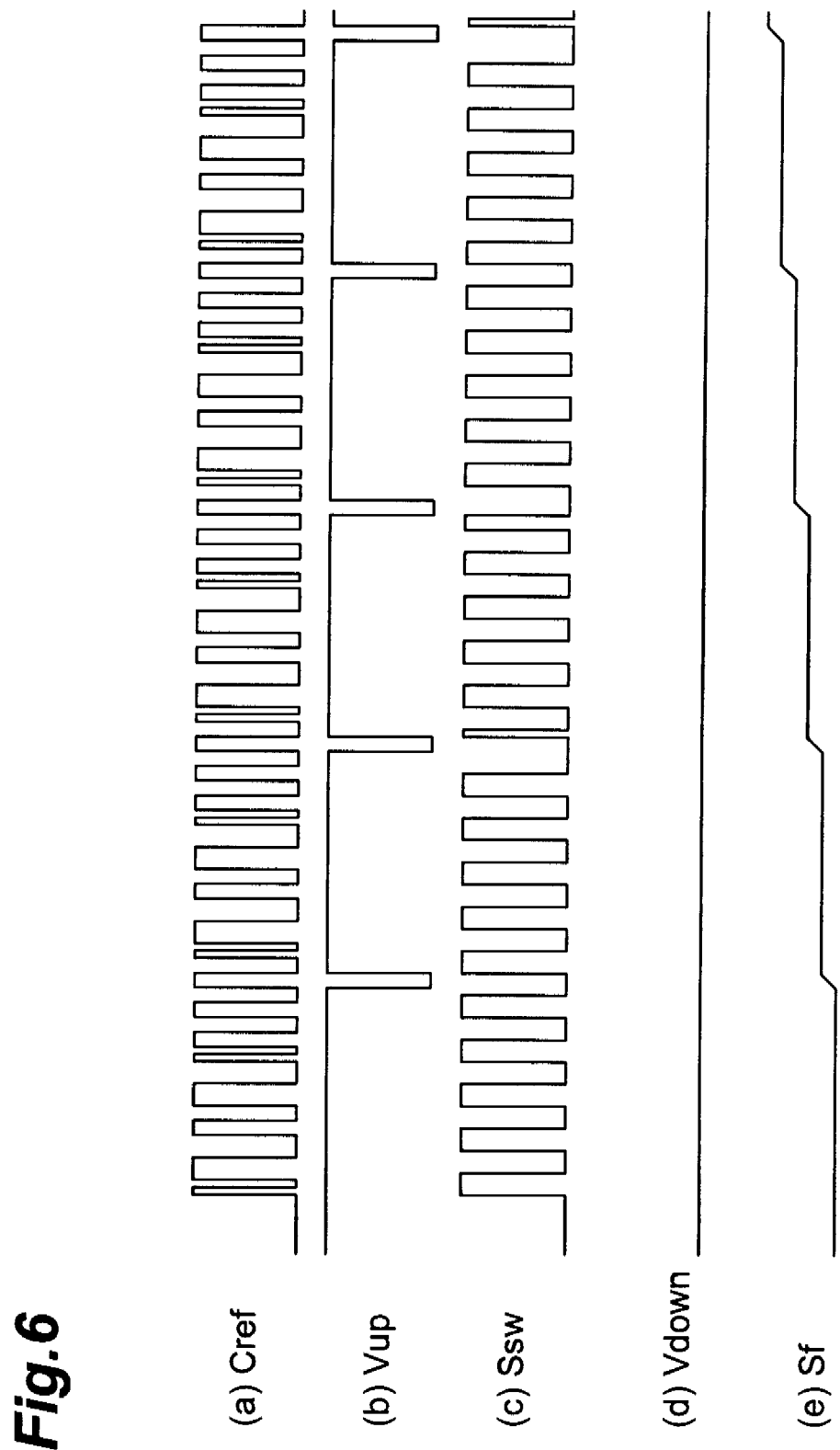
FIG. 6 is a timing chart which shows the respective signal waveforms in a case where jitter is produced in a reference clock in FIG. 4.

Furthermore, the counter section 60 of the comparator-system DC-DC converter 1 of the first embodiment counts pulses over a predetermined period of the reference clock Cref (period with a count from several hundred to several thousand of the reference clock cycle, for example). In other words, the counter section 60 senses the average frequency of the reference clock Cref. Therefore, even in cases where a large jitter is contained in the input reference clock Cref as shown in FIG. 6, in the case of the comparator-system DC-DC converter 1 of the first embodiment, the switching control signal Ssw is not affected by the jitter of the reference clock Cref and the fluctuations of the switching frequency can be reduced.

Second Embodiment

A comparator-system DC-DC converter 1A according to the second embodiment of the present invention will be described next. The comparator-system DC-DC converter 1A differs from that of the first embodiment in that the comparator-system DC-DC converter 1A is constituted comprising a timer section 30A and a counter section 60A in place of the timer section 30 and counter section 60 respectively in the comparator-system DC-DC converter 1. Otherwise, the constitution of the comparator-system DC-DC converter 1A is the same as that of the comparator-system DC-DC converter 1.

Figure 7:
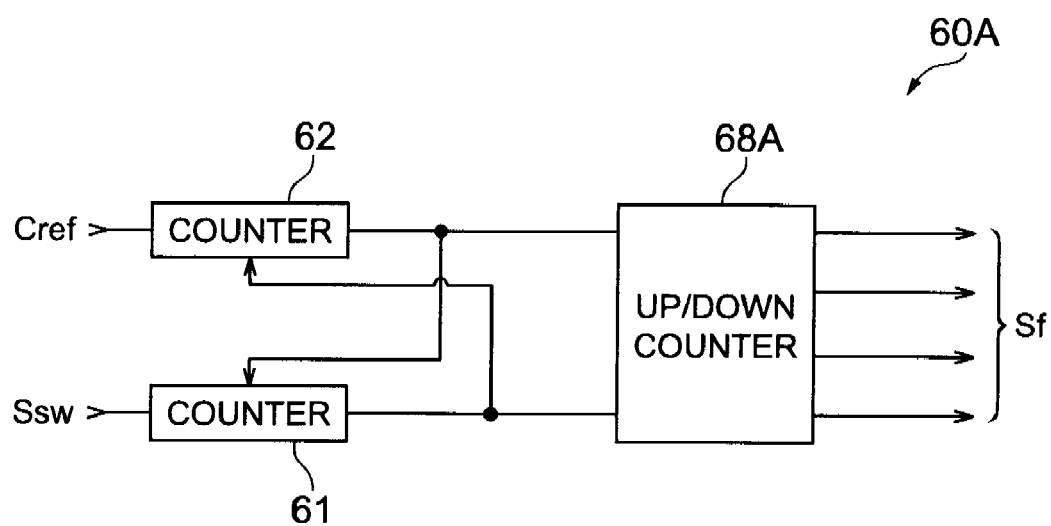
FIG. 7 is a circuit diagram which shows a counter section according to a second embodiment of the present invention.

FIG. 7 is a circuit diagram showing the counter section 60A according to the second embodiment of the present invention. The counter section 60A shown in FIG. 7 differs from that of the first embodiment in that same is a digital circuit. More specifically, the counter section 60A differs from that of the first embodiment in that the counter section 60A is constituted comprising an up/down counter 68A in place of the NOR circuit 63, NAND circuit 64, charge pump circuit 67 and counter capacitor 68. Otherwise, the constitution of the counter section 60A is the same as that of the counter section 60.

The up/down counter 68A receives a pulse voltage from the first counter 61 and a pulse voltage from the second counter 61 and increases or reduces the count value. The up/down counter 68A outputs a four-bit digital frequency control signal Sf to the timer section 30A.

Figure 8:
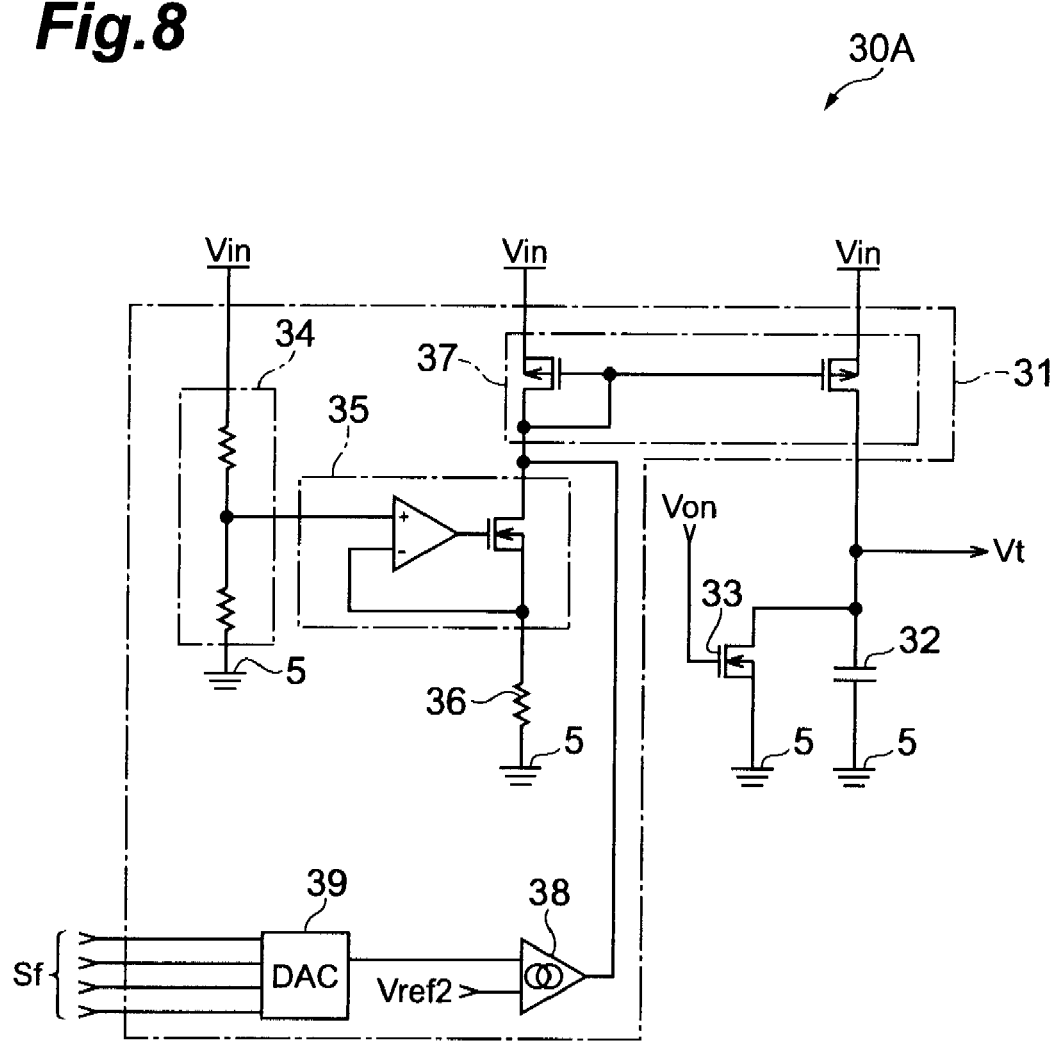
FIG. 8 is a circuit diagram which shows a timer section according to the second embodiment of the present invention.

FIG. 8 is a circuit diagram which shows the timer section 30A according to the second embodiment of the present invention. The timer section 30A shown in FIG. 8 differs from the first embodiment in that the timer section 30A is constituted comprising a digital/analog conversion section (called a 'DAC' hereinbelow) 39 in addition to the timer section 30. Otherwise, the constitution of the timer section 30A is the same as that of the timer section 30.

The DAC 39 converts the four-bit digital frequency control signal Sf from the up/down counter 68A into an analog signal. The output terminal of the DAC 39 is connected to one input terminal of the gm amplifier 38.

The comparator-system DC-DC converter 1A of the second embodiment makes it possible to obtain the same benefits as those of the first embodiment.

Third Embodiment

A comparator-system DC-DC converter 1B according to the third embodiment of the present invention will be described next. The comparator-system DC-DC converter 1B differs from that of the second embodiment in that the comparator-system DC-DC converter 1B is constituted comprising a timer section 30B in place of the timer section 30A in the comparator-system DC-DC converter 1A. Otherwise, the constitution of the comparator-system DC-DC converter 1B is the same as that of the comparator-system DC-DC converter 1A.

Figure 9:
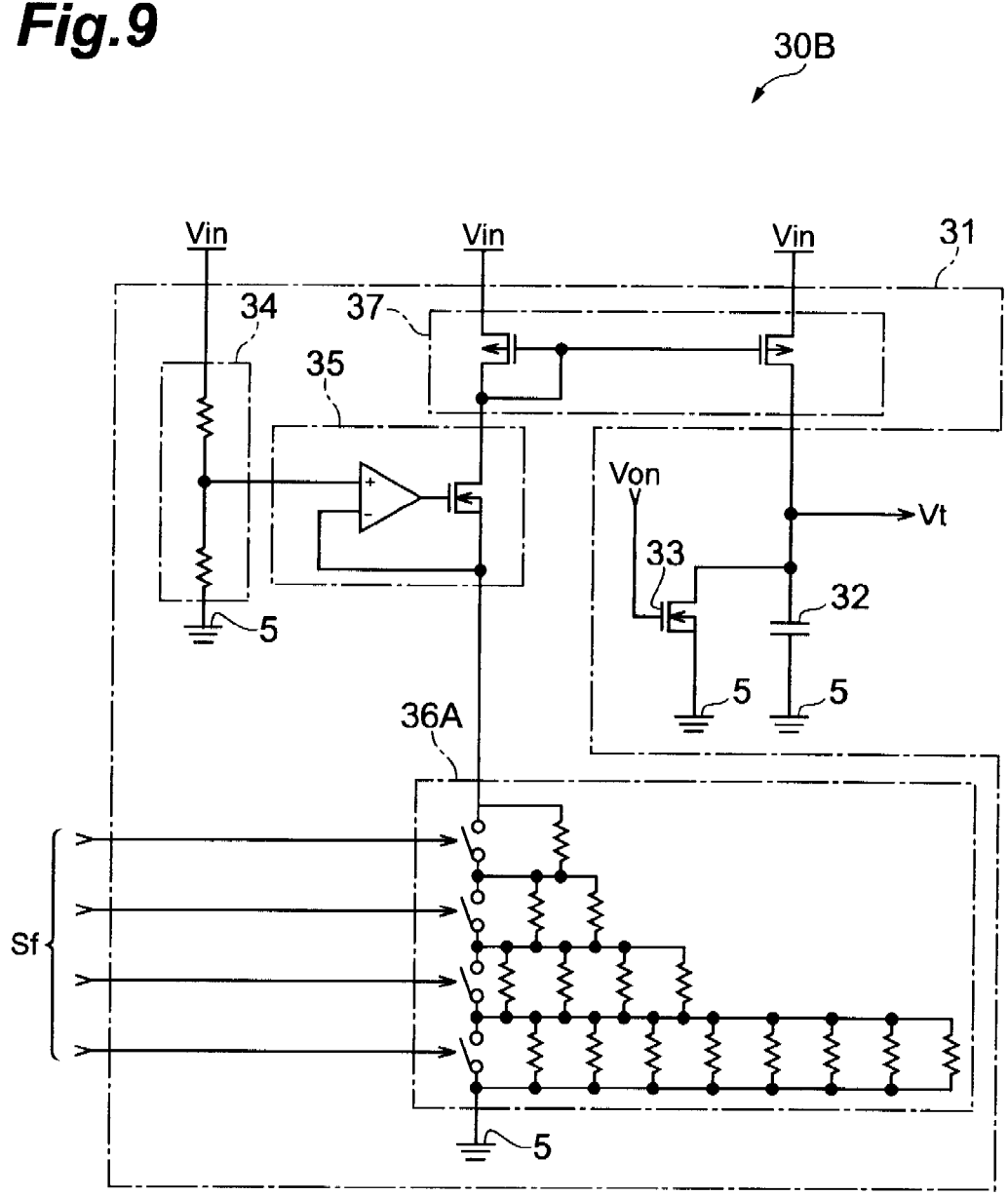
FIG. 9 is a circuit diagram which shows a timer section according to a third embodiment of the present invention.

FIG. 9 is a circuit diagram showing the timer section 30B according to the third embodiment of the present invention. The timer section 30B shown in FIG. 9 differs from that of the second embodiment in that timer section 30B is constituted comprising a variable resistance section 36A in place of the resistance element 36, gm amplifier 38, and DAC 39 in the timer section 30A. Otherwise, the constitution of the timer section 30B is the same as that of the timer section 30A.

The variable resistance section 36A is constituted by a resistance element and a switching element and is able to change the resistance value by controlling the switching element in accordance with the four-bit digital frequency control signal Sf from the up/down counter 68A and is able to control the current of the voltage follower and current mirror circuit.

The comparator-system DC-DC converter 1B of the third embodiment makes it possible to obtain the same benefits as those of the first embodiment.

In addition, in the case of the comparator-system DC-DC converter 1B of the third embodiment, an extreme shortening of the ON width of the ON pulse can be easily prevented by stopping the up/down counter 68A also during light load mode.

The present invention is not limited to the above embodiment, a variety of modifications being feasible.

In this embodiment, the timer section 30 controls the ON time width Pon but may also control the OFF time width Poff. In this case, the drive circuit 13 generates an auxiliary drive signal with which, when the switching control signal Ssw is a high level signal, the switching element 11 enters an OFF state and the switching element 12 enters an ON state.

In addition, the method for changing the ON width of the ON pulse Pon of the switching control signal Sw is not limited to that of this embodiment. Rather, a variety of embodiments may be considered. For example, the charging current of the timer capacitor 32 may also be changed by changing the para number of the transistor 35b of the voltage follower 35. The charging current of the timer capacitor 32 may also be changed by changing the para number of the transistors 37a and 37b of the current mirror circuit 37, or the charging current of the timer capacitor 32 may be changed by changing the division ratio of the input voltage division circuit 34.

Figure 10:
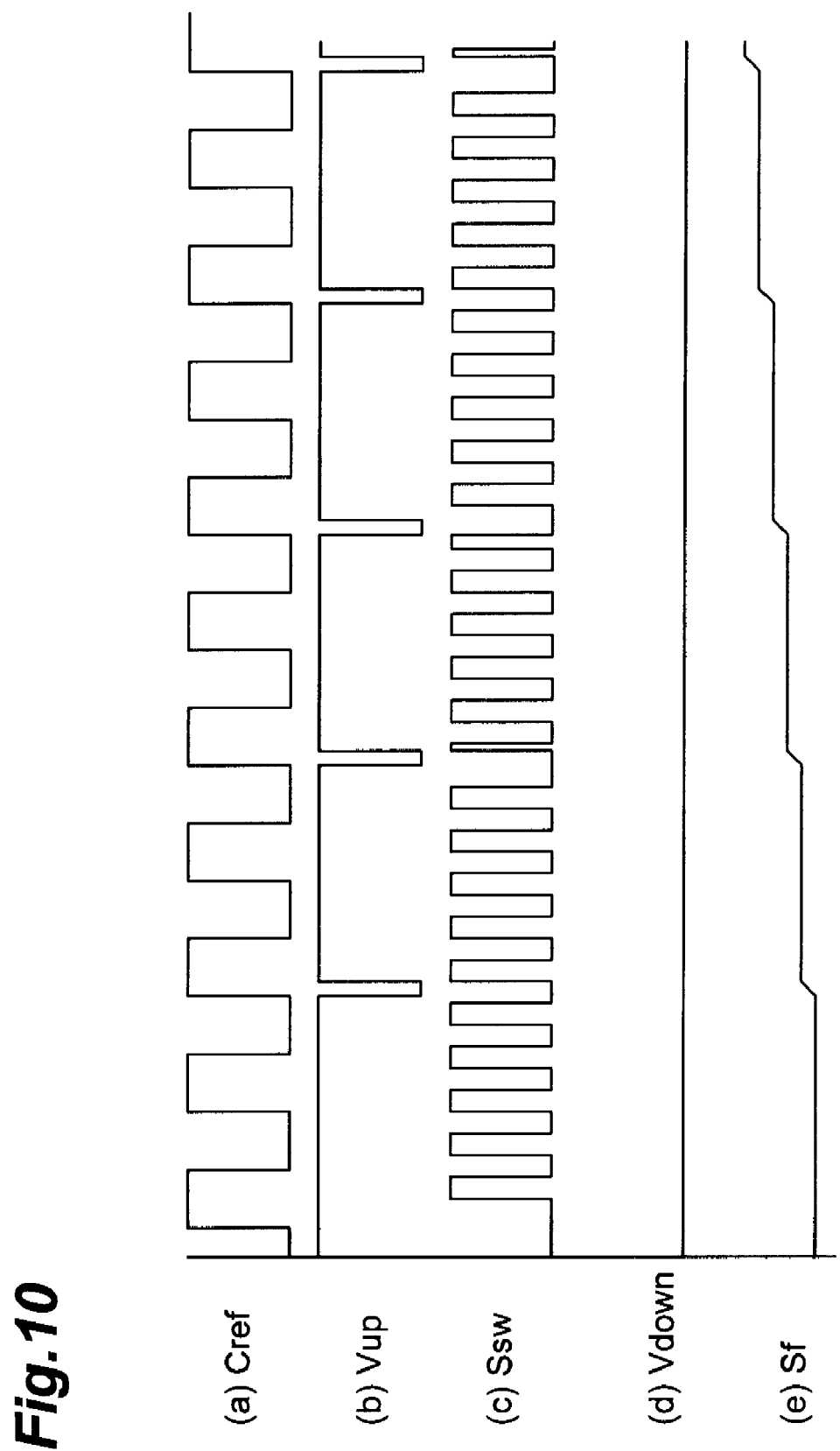
FIG. 10 is a timing chart which shows the respective signal waveforms in a case where the frequency of the reference clock in FIG. 4 is lower than the frequency of the switching control signal.

In addition, in this embodiment, the frequency of the reference clock Cref of the counter section 60 is the same as the frequency of the switching control signal Ssw. However, the ratio between the frequency of the reference clock Cref and the frequency of the switching control signal Ssw may also be N:M (M and N are natural numbers). Here, the counter section 60 adjusts the predetermined ON width of the ON pulse of the switching control signal so that the ratio between the count value of the switching control signal Ssw and the count value of the reference clock Cref is M:N. In particular, as shown in FIG. 10, the frequency of the reference clock Cref is preferably lower than the frequency of the switching control signal Ssw. The current consumed can thus be reduced.

The comparator section compares the output voltage of the voltage conversion section 100 and the reference voltage and determines a predetermined ON width of the ON pulse or the OFF width of the OFF pulse of the control signal.

In addition, in this embodiment, the first counter 61 counts only the ON pulses of the switching control signal Ssw but may also count at least one of the ON pulses and the OFF pulses of the switching control signal Ssw.

Furthermore, in this embodiment, an output voltage Vout is input to the negative input terminal of the second comparator but a certain reference voltage may also be input to the negative input terminal of the second comparator.

In addition, in this embodiment, the voltage conversion section 100 is a synchronous rectification circuit which uses two switching elements 11 and 12 but may also employ a diode in place of the switching element 12.

Furthermore, although an n-type MOSFET is employed as a switching element 11 of the voltage conversion section 100 in this embodiment, a p-type MOSFET may also be employed. Moreover, a variety of transistors such as a FET or bipolar transistor can be applied to the switching elements and transistors of this embodiment.

The invention claimed is:

1. A comparator-system DC-DC converter, comprising:
a voltage conversion section which comprises a switching element and generates an output voltage obtained by voltage-converting an input voltage by controlling the switching element in accordance with a control signal; and
a control unit which generates the control signal for stabilizing the output voltage of the voltage conversion section,
wherein the control unit comprises:
a comparator section which compares the output voltage of the voltage conversion section and a reference voltage, and determines a predetermined ON width of an ON pulse or the OFF width of an OFF pulse of the control signal; and
a counter section which counts a number of at least either one of the ON pulses and OFF pulses of the control signal, and
counts a number of pulses of a reference clock in a predetermined period that includes a plurality of pulses of the reference clock to change an analog level or a digital value of a frequency control signal that adjusts the predetermined ON width so that the ratio between the count value of the control signal and the count value of the reference clock is M:N, where M and N are natural numbers,
wherein the count value of the control signal indicates the number of said pulses of the control signal, and
wherein the count value of the reference clock indicates the number of said pulses of the reference clock.

2. The comparator-system DC-DC converter according to claim 1,
wherein the comparator section comprises:
a first comparator which detects that the output voltage of the voltage conversion section is smaller than the reference voltage, and determines the detection time point as an ON pulse start time point; and
a second comparator which detects that a predetermined time has elapsed from the ON pulse start time point, and determines the detection time point as an ON pulse end time point,
wherein the counter section adjusts the predetermined ON width by adjusting the predetermined time.

3. The comparator-system DC-DC converter according to claim 2,
wherein the control unit further comprises
a timer section which comprises a timer capacitor which is connected to a fixed current source and starts the charging of the timer capacitor from the ON pulse start time point,
wherein the second comparator detects that a predetermined time has elapsed from the ON pulse start time point by detecting that the voltage of the timer capacitor of the timer section is equal to or more than a predetermined voltage, and
wherein the counter section adjusts the predetermined time by adjusting a charging current of the timer capacitor of the timer section.

4. A comparator-system DC-DC converter, comprising:
a voltage conversion section which comprises a switching element and generates an output voltage obtained by voltage-converting an input voltage by controlling the switching element in accordance with a control signal; and
a control unit which generates the control signal for stabilizing the output voltage of the voltage conversion section,
wherein the control unit comprises:
a comparator section which compares the output voltage of the voltage conversion section and a reference voltage, and determines a predetermined ON width of an ON pulse or the OFF width of an OFF pulse of the control signal; and a counter section which counts at least either one of the ON pulses and OFF pulses of the control signal and counts the reference clocks to adjust the predetermined ON width so that the ratio between the count value of the control signal and the count value of the reference clock is M:N where M and N are natural numbers, wherein the comparator section comprises:

a first comparator which detects that the output voltage of the voltage conversion section is smaller than the reference voltage, and determines the detection time point as an ON pulse start time point; and a second comparator which detects that a predetermined time has elapsed from the ON pulse start time point, and determines the detection time point as an ON pulse end time point, wherein the counter section adjusts the predetermined ON width by adjusting the predetermined time, wherein the control unit further comprises a timer section which comprises a timer capacitor which is connected to a fixed current source and starts the charging of the timer capacitor from the ON pulse start time point, wherein the second comparator detects that a predetermined time has elapsed from the ON pulse start time point by detecting that the voltage of the timer capacitor of the timer section is equal to or more than a predetermined voltage, and wherein the counter section adjusts the predetermined time by adjusting a charging current of the timer capacitor of the timer section, and wherein the counter section comprises:

a first counter which counts at least either one of the ON pulses and the OFF pulses of the control signal and generates a pulse signal when the count value has reached a predetermined value;

a second counter which counts the reference clocks and generates a pulse signal when the count value has reached a predetermined value;

a NAND circuit which receives the pulse signal from the first counter and the pulse signal from the second counter;

a NOR circuit which receives the pulse signal from the first counter and the pulse signal from the second counter;

a charge pump circuit which supplies a charging current in accordance with an output signal from the NAND circuit and draws a charging current in accordance with an output signal from the NOR circuit; and a counter capacitor which is connected to the charge pump circuit, wherein the charging current of the timer capacitor is adjusted in accordance with the voltage across the terminals of the counter capacitor.

5. A comparator-system DC-DC converter, comprising:

a voltage conversion section which comprises a switching element and generates an output voltage obtained by voltage-converting an input voltage by controlling the switching element in accordance with a control signal; and a control unit which generates the control signal for stabilizing the output voltage of the voltage conversion section, wherein the control unit comprises:

a comparator section which compares the output voltage of the voltage conversion section and a reference voltage, and determines a predetermined ON width of an ON pulse or the OFF width of an OFF pulse of the control signal; and a counter section which counts at least either one of the ON pulses and OFF pulses of the control signal and counts the reference clocks to adjust the predetermined ON width so that the ratio between the count value of the control signal and the count value of the reference clock is M:N where M and N are natural numbers, wherein the comparator section comprises:

a first comparator which detects that the output voltage of the voltage conversion section is smaller than the reference voltage, and determines the detection time point as an ON pulse start time point; and a second comparator which detects that a predetermined time has elapsed from the ON pulse start time point, and determines the detection time point as an ON pulse end time point, wherein the counter section adjusts the predetermined ON width by adjusting the predetermined time, wherein the control unit further comprises a timer section which comprises a timer capacitor which is connected to a fixed current source and starts the charging of the timer capacitor from the ON pulse start time point, wherein the second comparator detects that a predetermined time has elapsed from the ON pulse start time point by detecting that the voltage of the timer capacitor of the timer section is equal to or more than a predetermined voltage, and wherein the counter section adjusts the predetermined time by adjusting a charging current of the timer capacitor of the timer section, and wherein the counter section comprises:

a first counter which counts at least either one of the ON pulses and the OFF pulses of the control signal and generates a pulse signal when the count value has reached a predetermined value;

a second counter which counts the reference clocks and generates a pulse signal when the count value has reached a predetermined value; and an up/down counter which is connected to an output terminal of the first counter and an output terminal of the second counter, wherein the charging current of the timer capacitor is adjusted in accordance with the output signal of the up/down counter.

* * * * *